J and L Miller.
Mower.
No. 24,700   Patented July 5, 1859.
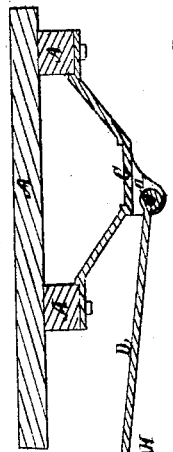
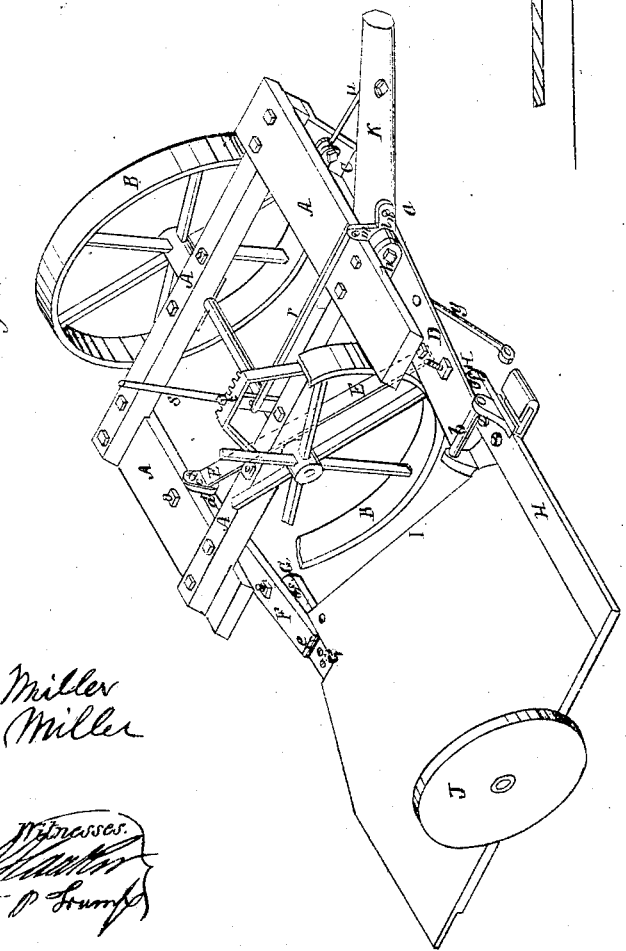
Jacob Miller
Lewis Miller

UNITED STATES PATENT OFFICE.

JACOB MILLER AND LEWIS MILLER, OF CANTON, OHIO, ASSIGNORS TO C. AULTMAN & CO., OF SAME PLACE.

IMPROVEMENT IN HARVESTERS.

Specification forming part of Letters Patent No. 24,700, dated July 5, 1859.

*To all whom it may concern:*

Be it known that we, JACOB MILLER and LEWIS MILLER, of Canton, in the county of Stark and State of Ohio, have invented certain new and useful Improvements in Harvesting-Machines; and we do hereby declare the following to be a full, clear, and exact description of the same, reference being had to the accompanying drawings, making a part of this specification, in which—

Figure 1 represents in perspective a portion of a harvesting-machine sufficient to illustrate the character of our invention; and Fig. 2 represents a vertical section taken through the cutter-bar and main frame in line with it, as also through the hinged bar by which they are connected.

Similar letters of reference, where they occur in the separate figures, denote like parts of the machine in both of them.

In the construction of grain and grass harvesters upon the plan invented by us, and in which the finger-beam and platform have heretofore been hinged to the main frame, no proper provision was made for controlling said finger-beam or platform and at the same time relieve them from the rising and the other motions of the main frame. To simply hinge the finger-beam and platform leaves them entirely too uncontrollable. To suspend them to the main frame in addition to the hinge-connection causes them to receive all the rising or rolling motions of said main frame. We have discovered the evil consequences of both these plans, and devised means for obviating the latter objection, while we still hinge the finger-beam and platform to the main frame; or, in other words, we retain all the advantages of a hinged connection between the finger-beam and platform when used, while we have greater control over the hinged joint, and avoid transmitting the motions of the main frame to said finger-beam or platform; and the nature of our invention consists in suspending a finger-beam or platform that is hinged to the main frame, to the hinged arms by which they are connected to the said main frame, and not to the main frame itself, by which means all the advantages of the hinged joint and the proper bracing may be obtained without transmitting the motions of the main frame to said finger-beam or platform.

To enable others skilled in the art to make and use our invention, we will proceed to describe the same with reference to the drawings.

A represents the main frame, supported upon the carrying and driving wheels B. Underneath the front part of the main frame is a bracket or hanger, C, to which one end of the brace or bar D is hinged, as at $a$, the other end of said brace or bar being hinged at $b$ to the platform or finger-beam, or to a plate that is attached to or unites them. The bar D is strengthened by a transverse brace, E, that is rigidly bolted to said bar D, and, extending back, is pivoted to the rear of the machine, as at $c$, so that it will allow said bar to freely work on its hinged point $a$. The rear of the platform may be similarly hinged to the main frame, as its front is—viz., by a bar, F, which may be of wood, however—while that in front, D, should be of metal, said bar being hinged at $d$ to the main frame and at $e$ to the platform or platform-bar G.

H may represent the finger-beam, or it may be a separate beam to which the platform is united, or on which it is supported. This beam or bar H (as well as the one G) projects beyond the inside edge I of the platform far enough to receive a suspension-bolt, $ff$, (one in each,) which bolts suspend said bars to the hinged pieces D F, and thus allow the inner edge of the platform to rise or yield upward to a given extent, which may be adjusted or regulated by the nuts on the suspension-bolts, but which prevent said inner edge of the platform from dropping below a given line; and thus while the main frame and the platform may freely move on the hinged or pivoted points $a$ $d$, there is provision for a rising motion along the inner line edge of the platform, which can take place without in any wise affecting or being affected by the rising of the outer part of the platform or of the main frame; and thus if the inside shoe or divider should pass over any obstacle the platform and braces will admit of rising to yield to such obstacles without affecting the main frame or outer portion of said platform. If the braces D F were suspended to the main frame A, as in some of our former machines, it is obvious that the rising of the main frame must lift up said braces, and they would carry up the platform or cutters, and thus if the most remote wheel should drop into a hole and throw up the main frame this shock or rising up would be communicated through the hinged arms or braces to the cutters or platform; but by suspending the platform or its bars or beams to the hinged arms D F, as shown, no such dropping of a wheel would affect the platform or cutter, as the frame would simply rock on the joints a d, and the motion be confined to itself.

The platform has an outside supporting-wheel, J, which may be adjustable, so as to lower or raise the outer end of the platform; but when the machine is to be used as a mower the platform and outer wheel are removed. The rear hinged arm, F, may also be removed, as it is not used when the machine is converted into a mower.

g is a brace designed for bracing in the inside shoe or divider.

The tongue K is pivoted at its heel to the frame, h being the pivoting-bolt.

i is a T-shaped lever, one arm of which is bolted to the tongue at n, another arm receives the bolt h through it, and to the third arm m is attached a connecting-rod r, which, extending rearward, is attached to a lever, s, by which the main frame can be raised or lowered, and held when at the proper height by a tooth or projection on said lever taking into one of the notches in the catch-piece t. The tongue is braced by a brace, u, fastened to it, and pivoted at v to the main frame.

Having thus fully described the nature and object of our invention, we would state that we are aware a knuckle has heretofore been used for regulating the extent of motion between the finger-bar and the yielding hinged bar, having so used one ourselves. To this we lay no claim in this application; but

What we do claim is—

Extending the finger or platform bar, one or both, far enough under the yielding bars by which they are hung to the main frame as that the two may be united by suspension-rods, which allows them a yielding motion in one direction, makes them rigid in another direction, and prevents the motion of the main frame from being communicated to the finger-bar, substantially as described.

JACOB MILLER.
LEWIS MILLER.

Witnesses:
S. WALKER,
PETER P. TRUMP.